May 1, 1951  M. IWONIUK  2,551,001
YIELDABLE TRACTOR HITCH
Filed Aug. 23, 1948  2 Sheets-Sheet 1

Inventor:
Mike Iwoniuk.
By: Fetherstonhaugh & Co
his Atty's.

May 1, 1951  M. IWONIUK  2,551,001
YIELDABLE TRACTOR HITCH
Filed Aug. 23, 1948  2 Sheets-Sheet 2
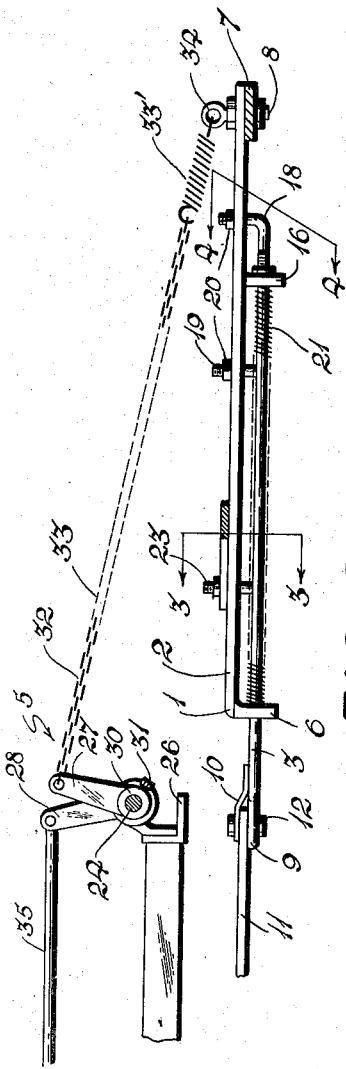
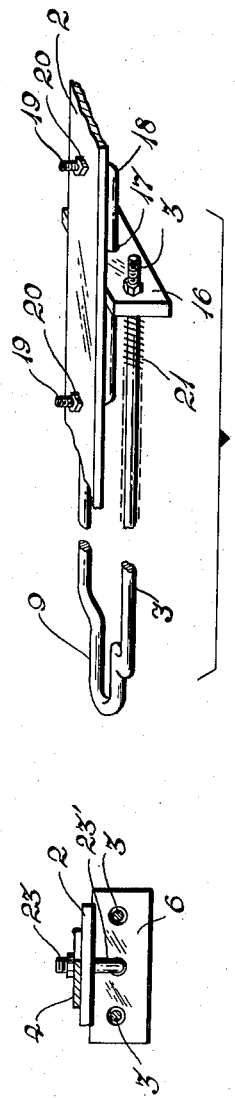
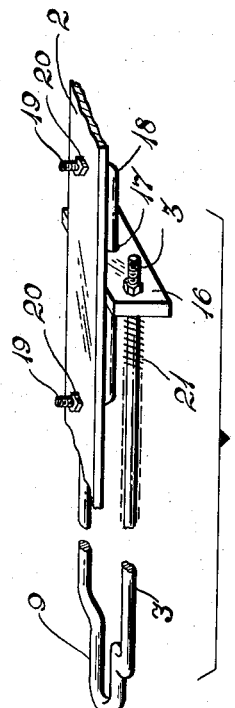
Inventor:
Mike Iwoniuk.

Patented May 1, 1951

2,551,001

UNITED STATES PATENT OFFICE 2,551,001

YIELDABLE TRACTOR HITCH

Mike Iwoniuk, Russell, Manitoba, Canada

Application August 23, 1948, Serial No. 45,657
In Canada January 23, 1948

1 Claim. (Cl. 180—14.5)

My invention relates to new and useful improvements in tractor hitches, and the principal object of the invention is to provide a device of the character herewithin described which will prevent injury to an implement being towed by a tractor when said implement strikes an obstacle, and which, at the same time, will not disconnect the implement from the tractor.

A further object of my invention is to provide a device of the character herewithin described whereby the clutch of a tractor may be disengaged when the implement being towed encounters an unusually hard obstacle, but which will not prevent the operator from re-engaging the clutch in order to maneuver the tractor and implement.

A still further object of my invention is to provide a device of the character herewithin described which has a shock absorbing action, and which may be adjusted to yield to a predetermined extent before the mechanism for disengaging the clutch is actuated.

Another object of my invention is to provide a device of the character herewithin described which is of a simple nature both in construction and operation, and which is economical to manufacture, and which may be applied to any combination of tractor and towed implement.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 2 is a side elevational view of the same.

Figure 3 is a sectional view taken along the line 3—3 of Figure 2.

Figure 4 is a fragmentary sectional view taken along the line 4—4 of Figure 2.

In the drawings like characters of reference indicate corresponding parts in the different figures.

Figure 1:
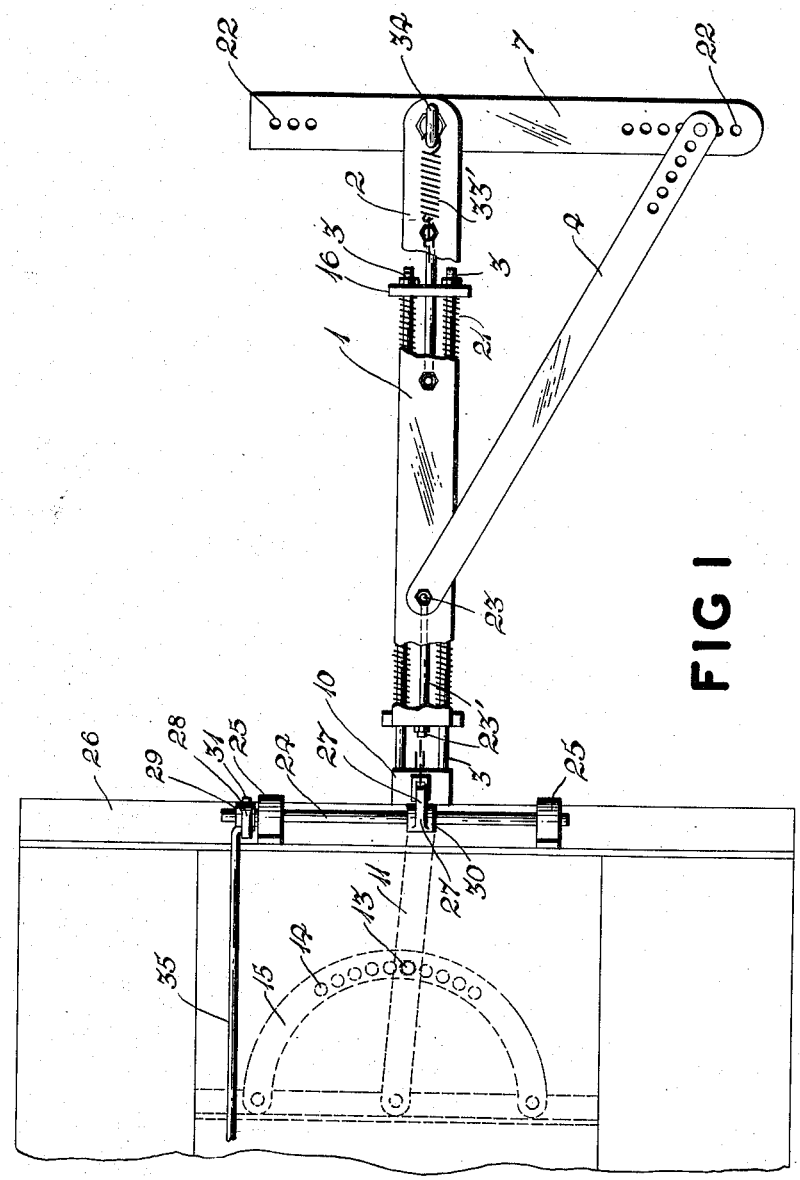
Figure 1 is a plan view of my invention in situ upon the tractor.

It will be realized that when an implement which is being towed behind a tractor, strikes an unusually hard or comparatively solid object, considerable shock and strain is imparted both to the implement itself and to the hitching or towing device incorporated therein, with the resultant possibility of deformation or fracture. Consequently I have designed the tractor hitch hereinafter described in order to overcome these objections without causing disconnection to take place between the tractor and the implement being towed, thus permitting the tractor operator to maintain control and maneuverability of the implement.

Proceeding now to describe my invention in detail, it will be seen upon reference to the accompanying drawings that it comprises a shock absorbing assembly collectively designated 1 embodying a guide member 2, the spring carrying rods 3, the bracing bar 4 and the linkage system 5.

The aforementioned guide member 2 is comprised of a flat bar formed in the configuration most clearly illustrated in Figure 2 of the accompanying drawings. It will be seen that this bar is angulated at the forward end thereof to form the slider plate 6 which is drilled to receive slidably the rods 3. The rearward end of the guide member is drilled and pivotally attached to the implement attachment bar 7 by means of the bolt 8. The spring carrying rods 3 are comprised of two parallel spaced members which converge at their forward end to form the attachment eye 9. It will be appreciated that these two rods may be formed separately and connected at this eye-piece, but it is preferable that they be manufactured from one length of bar and counterangulated to the required configuration.

The joggled plate 10 is attached adjacent this eye-piece by welding or the like and is drilled vertically immediately above the aforementioned eye-piece. This plate, together with the eye-piece, forms a clevis to which is attached the rearward end of the tractor draw-bar 11 by means of the bolt 12. This drawbar is pivoted at its forward end upon a portion of the tractor, and secured in the position desired by engaging the bolt 13 in one of the drill-holes 14 provided in the quadrant 15.

The rearward ends of the spring carrying bars or rods 3 are rigidly attached to the spacer plate 16, and it will be seen upon reference to Figure 4 in the accompanying drawings that this plate also acts as a travel limiting means in that it is drilled centrally at 17, and is slidably mounted on the limiting rod 18. This limiting rod is positioned parallel to and between the aforementioned spring carrying rods 3, and is angulated at the ends thereof in order to permit rigid attachment to the guide plate 2, by the nuts 20 or similar means. Two coil springs 21 are positioned about the rods 3 and react between the slider plate 6 and the spacer plate 16.

The implement attachment bar 7 is provided with a plurality of drill holes 22 along its length whereby it may be clevissed to an implement in the usual manner, and it is further secured to the guide plate 2 by means of a brace 4 bolted at the rearward end to said attachment bar and at its forward end to the aforementioned guide plate. The forward attachment bolt 23 comprises a relatively short angulated rod 23' which passes through the guide plate and extends forward to be attached to the slider plate 6 in order to impart rigidity thereto, and is clearly shown in Figure 3 of the accompanying drawings.

Extending between the attachment bar 7 and the clutch operating lever of the tractor (not illustrated) is the linkage system 5 which consists in part of a shaft 24 pivotally mounted in the aligned bearings 25 which are spaced apart and secured upon the angle bar 26 extending transversely across the rear of the tractor. Lever arms 27 and 28 are provided with collars 29 and 30 formed integrally upon the lower end thereof whereby they are mounted upon the shaft 24 and may be secured in any position desired by means of the setscrews 31. In this instance, the lever arm 28 is secured upon the end of the shaft 24 and the lever arm 27 is secured upon the shaft at a joint immediately above the pivot bolt 12 or as near thereto as possible. A resilient link 32 consisting of the chain 33 and the coil spring 33' joined together at adjacent ends, is secured at its forward end to the upper end of the arm 27 and at its rearmost end to the implement attachment bar bolt 8 which has formed on its uppermost end the eye-piece 34. The rigid rod link 35 is pivotally secured to the upper end of the lever arm 28 and extends forwardly to be similarly secured to the clutch lever (not illustrated) of the tractor. The links 32 and 35 being of a given length, the extent of compression of the coil springs 21 at which it is desired to disengage the clutch mechanism of the tractor may be varied by adjustment of the angular relationship between the lever arms 27 and 28.

With my invention secured between a tractor and a farm implement such as a plough, it will be seen clearly that as the tractor draws the plough through the ground, the coil springs 21 will bear the drag of the plough and will absorb minor shocks imparted thereto. However, when the springs are compressed to a predetermined extent, due to the plough striking some unusually hard obstacle, the consequent rearward extension of the guide plate 2 in relation to the rods 3 will take up the slack in the chain 33 and, through the medium of the linkage system 5, will pull the tractor clutch out of engagement, and so maintain said clutch until the springs 21 are again permitted to extend themselves.

This serves the purpose of stopping the forward movement of the tractor to prevent damage to the plough, but in addition, the provision of the tension spring 33' in the linkage system enables the operator of the tractor to shift to reverse gear and then re-engage the clutch in order to extricate the plough.

In this manner I have provided a tractor hitch which will fully protect implements against damage on striking obstacles and the like and which, when such an event does occur, will enable the operator to manipulate the tractor in order to extricate the implement without the necessity of dismounting and resetting the hitch as is the case with the various types of hitches now in use.

It is believed the advantages and use of my invention will be apparent from the foregoing disclosure, and accordingly further description thereof is considered unnecessary.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

A tractor hitch for yieldably attaching an implement to a tractor, comprising in combination with a conventional tractor draw-bar, a horizontally disposed and horizontally rotatable pivoted guide secured to said tractor draw-bar, said guide comprising a pair of spaced spring carrying rods and being provided with a spring stop at the rear end thereof in the form of a spacer plate, springs extending around said spring carrying rods, a guide plate positioned parallel with respect to said spring carrying rods, a slider plate secured to the forward end of said guide plate and movable on said spring carrying rods, a bracing bar connected to the forward end of said guide plate, a horizontal cross bar secured to the rear end of said guide plate, and to the remaining end of said bracing bar, said cross bar being disposed at right angles to said spring carrying rods and said guide plate, a spring-loaded chain secured to said cross bar substantially at the point of attachment of said cross bar to said guide plate, a vertically rotatable bell crank secured to said tractor, superimposed over the parts hereinbefore mentioned, the remaining end of said chain being secured to one of the arms of said bell crank, a rod secured to the remaining arm of said bell crank and connecting with a conventional tractor clutch, said springs, extending around said spring carrying rods, bearable at their forward end against said slider plate, and at their rearward ends against said spring stop, so that upon being arrested by an obstruction said implement will stop, the continued forward movement of said tractor causing said chain to become taut and thereby to rotate said bell crank to operate said clutch.

MIKE IWONIUK.

REFERENCES CITED

The following references are of record in the file of this patent:

UNITED STATES PATENTS

| Number | Name | Date |
|---|---|---|
| 1,372,413 | Flugekvam | Mar. 22, 1921 |
| 1,443,832 | Belcher | Jan. 30, 1923 |
| 1,767,396 | Rackow | June 24, 1930 |
| 1,935,707 | Glabus | Nov. 21, 1933 |
| 2,138,841 | Den Besten | Dec. 6, 1938 |
| 2,287,516 | Endres | June 23, 1942 |